(12) United States Patent
Suzuki et al.

(10) Patent No.: US 6,580,526 B1
(45) Date of Patent: Jun. 17, 2003

(54) HOUSING OF PORTABLE SCANNER

(75) Inventors: Minoru Suzuki, Tochigi-ken (JP); Katsuyoshi Suzuki, Tokyo (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/304,851

(22) Filed: May 5, 1999

(30) Foreign Application Priority Data

May 15, 1998 (JP) ............................................. 10-132805

(51) Int. Cl.⁷ ............................................. H04N 1/024
(52) U.S. Cl. ....................................................... 358/473
(58) Field of Search ................................. 358/473, 474, 358/472, 208.1; 382/313, 312, 471; 399/125

(56) References Cited

U.S. PATENT DOCUMENTS

| | | | | |
|---|---|---|---|---|
| 5,115,227 A | * | 5/1992 | Keiji | 358/473 |
| 5,121,226 A | * | 6/1992 | Kubota et al. | 358/473 |
| 5,268,715 A | | 12/1993 | Hirano | 399/125 |
| 5,940,546 A | * | 8/1999 | Howard | 358/473 |
| 6,002,124 A | * | 12/1999 | Bohn et al. | 250/208.1 |

* cited by examiner

Primary Examiner—Cheukfan Lee
(74) Attorney, Agent, or Firm—Greenblum & Bernstein, P.L.C.

(57) ABSTRACT

At least one longitudinal end portion of a portable scanner is formed such that, a thickness, along a direction perpendicular to a bottom surface of the housing, is smaller at a position closer to the end of the housing, and is larger at a position farther from the end of the housing. In particular, a side end surface at the longitudinal end portion is formed inclined with respect to the bottom surface at an acute angle.

31 Claims, 3 Drawing Sheets

FIG. 4
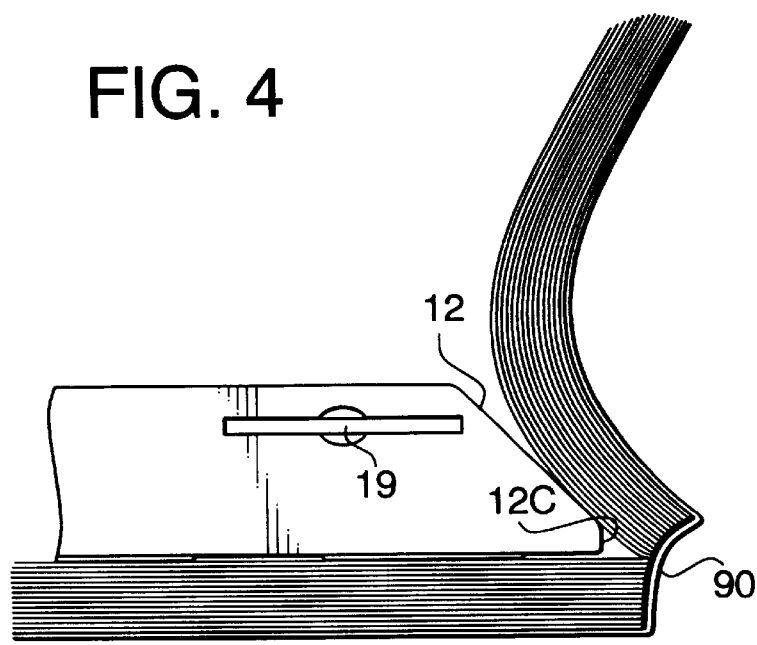
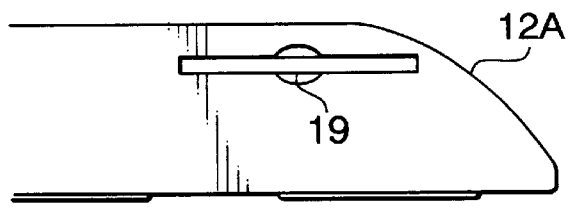
FIG. 5
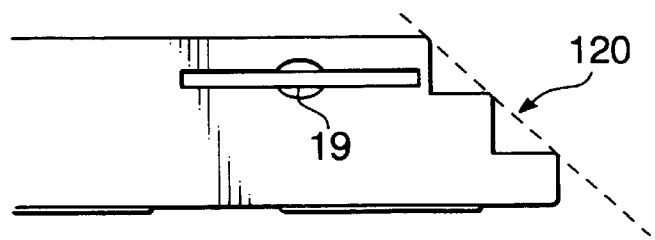
FIG. 6

HOUSING OF PORTABLE SCANNER

BACKGROUND OF THE INVENTION

The present invention relates to a housing of a portable scanner which is moved on a surface of an original to capture an image thereof.

Conventionally, portable scanners which are moved on a surface of an original to capture a two-dimensional image of the original have been known. Generally, such a portable scanner is provided with a line image sensor extending in a longitudinal direction (i.e., a main scanning direction). The scanner is moved in a direction perpendicular to the longitudinal direction (i.e., an auxiliary scanning direction) so that a two dimensional image is scanned.

There are two types of portable scanners. One type of a scanner is provided with an image reading optical system (image forming optical system) for forming a real image on an image sensor. The other type of a scanner employs a contact type image sensor which does not have an image forming optical system.

The former type is relatively large since the optical system is included, and is relatively heavy. However, since the image reduction optical system is employed, even if an original is not completely planar, as far as the original is located within a depth of field, an in-focus image can be obtained. On the contrary, the latter type requires the original should contact the image reading surface of the sensor. However, in the latter type, the size of the scanner can be made compact since the image forming optical system is not necessary.

In view of portability, weight, size and cost, the latter type is preferable and, in fact, broadly used as the portable scanner.

Since the portable scanner employs the contact type image sensor, problems as described below arise.

When a page of a relatively thick book is to be scanned, if a page 90L of a thick book 90 is to be scanned, as shown in FIG. 9, since the other page 90R interferes with a longitudinal end side of an image sensor 1000 and prevents the image sensor 1000 from being positioned sufficiently close to a seam (i.e., the inner margin 90M side). If the image sensor 1000 is forcibly located closer to the seam of the book, then the page 90L to be scanned may form a curve and therefore, it becomes impossible to keep the scanner 1000 in contact with the page 90L of the book 90 completely.

SUMMARY OF THE INVENTION

It is therefore an object of the invention to provide a housing of a portable scanner which is capable of maintaining a page to be scanned flat, and positioned sufficiently close to the seam of a book.

For the above object, according to the present invention, there is provided a housing of a portable scanner, the housing having a planar image reading surface extending in a longitudinal direction of the housing, the image reading surface contacting an original to be scanned. Within at least one longitudinal end portion of the housing is formed such that a thickness, along a direction perpendicular to the image reading surface, is smaller at a position closer to the end of the housing, and is larger at a position farther from the end of the housing.

With the above structure, the side end portion of the housing does not interfere with lifted pages of a book. Thus, a page to be scanned remains flat, and the housing can be positioned sufficiently close to the seam of the book.

Optionally, an end of the image reading surface is located within the end portion. Thus, the end of the image reading surface can be located close to the seam of the book.

In particular, at least a part of a side surface at the end of the housing is formed to be inclined at an acute angle with respect to the image reading surface. The acute angle may be within a range of 30 degrees to 60 degrees, and preferably 45 degrees.

The inclined surface may include a planar surface. Alternatively, the inclined surface may include a curved surface which is curved at least in the longitudinal direction of the housing. In particular case, the curved surface may be a convex surface. Further alternatively, at least a longitudinal end portion of said housing is formed to have steps instead of the inclined surface.

Further optionally, a shape of the housing may be a rectangular parallelepiped.

BRIEF DESCRIPTION OF THE ACCOMPANYING DRAWINGS

FIG. 4 shows a situation where a page of a thick book is scanned with the portable scanner shown in FIG. 1;

FIG. 5 is a first modification of the housing structure;

FIG. 6 is a second modification;

DESCRIPTION OF THE EMBODIMENT

Figure 1:
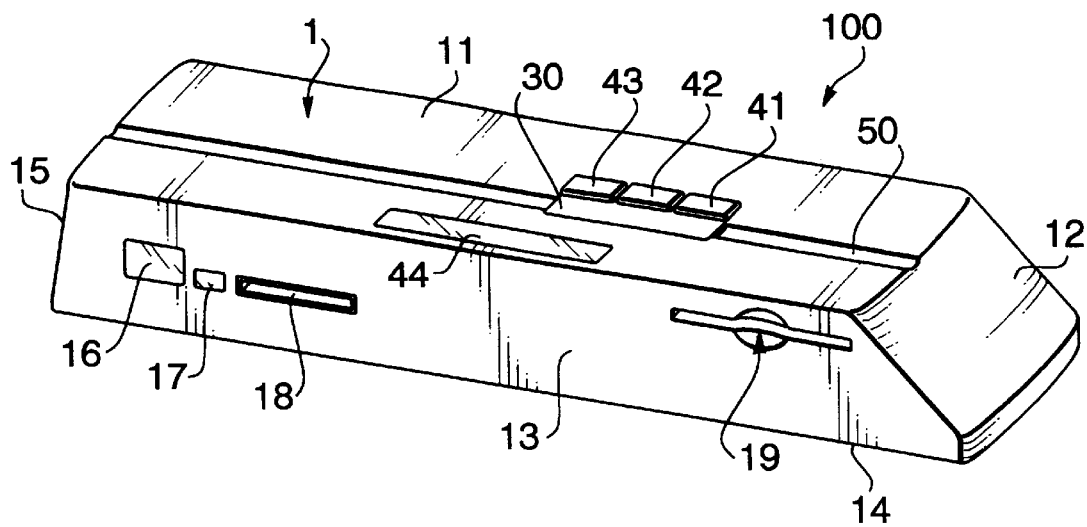
FIG. 1 shows a perspective view of a portable scanner embodying the present invention.

FIG. 1 is a perspective view of a portable scanner 100 according to an embodiment of the invention.

The portable scanner 100 is a color image scanner which is capable of reading a color image of an original and storing image data thereof. As shown in FIG. 1, the scanner 100 has a housing 1 whose shape is substantially a rectangular parallelepiped. On an upper surface 11 of the housing 1, an LCD (liquid crystal display) 30, operation switches 41 through 44 are provided. Along the longitudinal direction of the housing 1, a concave line 50 for indicating a scanning position is formed.

The operation switch 41 functions as an ON/OFF switch as well as a mode selection switch. The operation switch 42 is a switch for changing selective items within a mode selected by the switch 41. The operation switch 43 is a switch for establishing the item changed by the switch 42. The operation switch 44 is operated when a scanning operation (an image capturing operation) is started. The LCD 30 displays items and messages corresponding to operation of the switches 41 through 44, and operation status of the scanner 100.

On a side surface 13 of the housing 1, a USB (universal serial bus) interface connector 16 used for connecting the scanner 100 with another devices such as a computer, a terminal 17 for an AC adapter, a parallel-serial interface connector 18 for a printer, and a slot of an IC card connector 19, to which an IC card, e.g., a compact flash memory card) is inserted, are provided.

The bottom surface 14 of the housing 1 is an image reading surface which contacts a surface of an original when the image thereon is scanned.

At least one longitudinal end portion of the housing 1 is formed such that, a thickness, along a direction perpendicular to the bottom surface 14, is smaller at a position closer to the end of the housing 1, and is larger at a position farther from the end of the housing 1. Specifically, one end side surface 12 along the longitudinal direction of the housing 1 is formed to be an inclined surface with respect to the bottom surface 14. The surface 12 and the bottom surface 14 form an acute angle. The other end side surface 15, which is a side surface opposite to the surface 12 is substantially perpendicular to the bottom surface 14. The side surface 15 may also be formed to be an inclined surface which makes an acute angle with the bottom surface 14.

Figure 2:
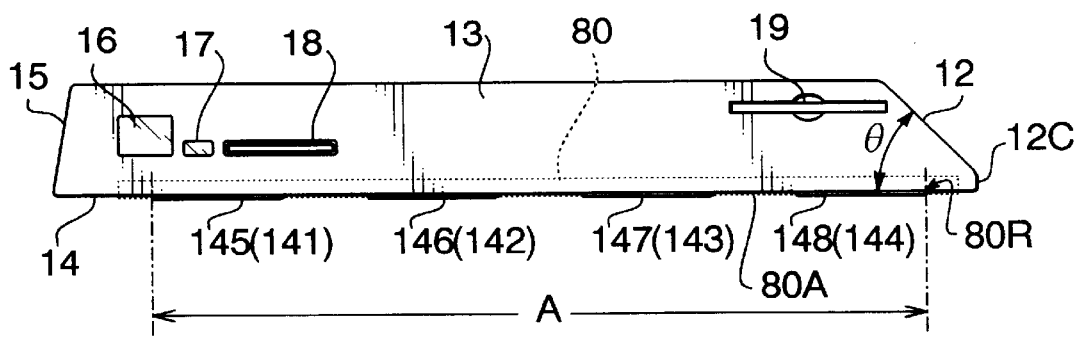
FIG. 2 is a side view of the portable scanner shown in FIG. 1.

FIG. 2 is a side view of the housing 1, viewed from the surface 13 side. An inclination angle θ, which is an angle formed between the bottom surface 14 and the inclined side surface 12) is an acute angle (i.e., less than 90 degrees). As shown in FIG. 2, the inclination angle θ is greater than 0 degrees and less than 90 degrees. Preferably, 30<θ<60 (degrees), and more preferably, θ is approximately 45 degrees.

With the above constitution, i.e., by configuring such that the surfaces 12 and 14 form an acute angle, it becomes possible to position the scanner 100 sufficiently close to the seam of a book 90 with maintaining the scanned page sufficiently flat. As shown in FIG. 2, the lifted pages of the book 90 do not interfere with the scanner 100, or the side surface 12. Therefore, the innermost portion of the image on the original can easily be scanned. Further, the scanner 100 can easily be moved in an auxiliary scanning direction (i.e., a direction perpendicular to a surface of FIG. 3) by contacting the bottom surface 14 on the page to be scanned.

It should be noted that the end portion 12C of the inclined surface 12 is formed to be perpendicular to the bottom surface 14. The surface 12C prevents the inclined surface 12 from cutting into the seam at which the pages are bound or nipped between the inner margins, and from skewing when the scanner 100 is moved in the auxiliary scanning direction, even if the scanner is pushed towards the seam or lifted pages.

Figure 3:
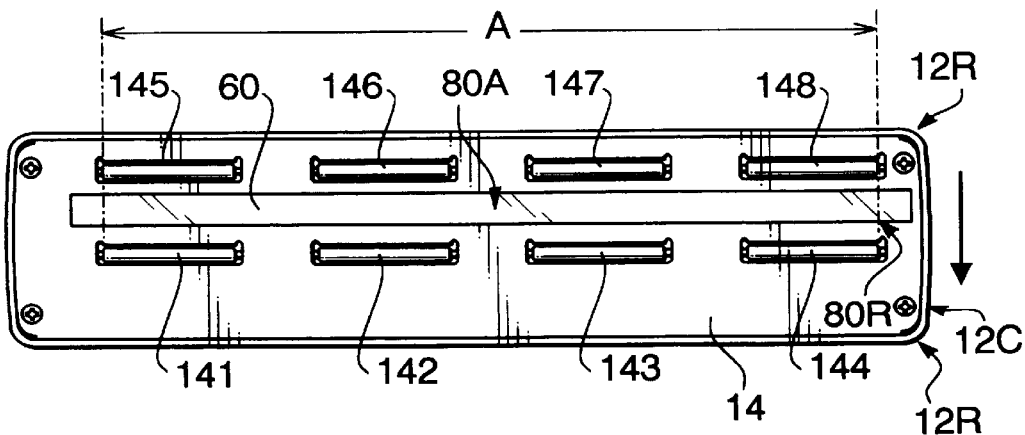
FIG. 3 is a bottom view of the portable scanner shown in FIG. 2.
Figure 8:
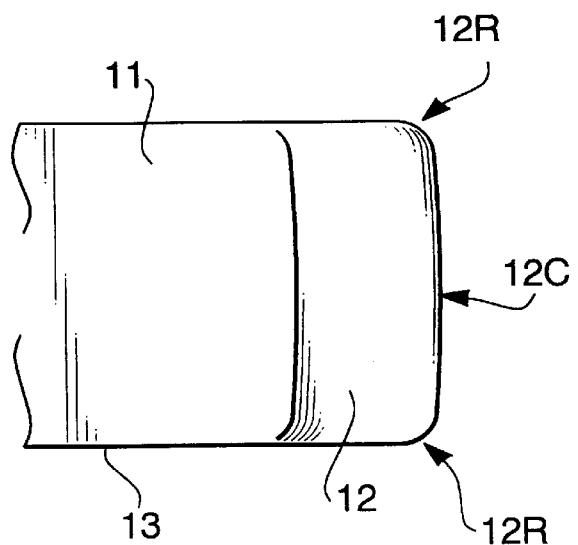
FIG. 8 is a top view of a side end of the scanner shown in FIG. 1.
Figure 9:
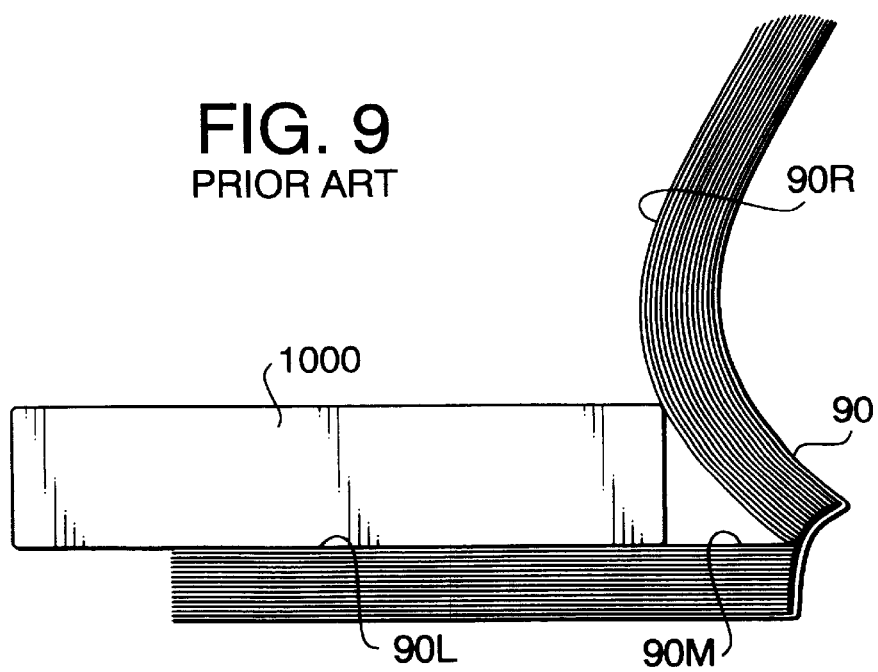
FIG. 9 shows a conventional portable scanner located on one page of a thick book.

FIG. 3 shows the bottom surface 14 of the scanner 100, and FIG. 8 shows a top view of the side end portion of the scanner 100. The end portion 12C of the inclined surface 12 is formed to have curved portions 12R at the end portions, along the auxiliary scanning direction (indicated by arrow in FIG. 3). This curved portion 12R also prevent the side end portion of the scanner 100 from cutting into the seam or being nipped by the inner margins of the facing pages.

The portable scanner 100 has a contact type line image sensor 80. As shown in FIGS. 2 and 3, the line image sensor 80 extends along the longitudinal direction of the housing 1. Further, the line image sensor 80 is movable in an up-down direction in FIG. 2 so that the image reading surface 80A of the line image sensor 80 is usually located at substantially the same plane defined by the lowermost portions of rollers 141 through 148. It should be noted that the rollers 141 through 148 are rollers each of which is rotatable about an axis extending in the longitudinal direction of the housing 1. The rollers 141 through 148 are rotated by a not shown driving mechanism when an image is scanned.

The line image sensor 80 has 2592 image receiving elements for 2592 dots of image. Within 2592 image receiving elements, the central 2552 elements (excluding 20 elements at each side end portion) are used as an effective image reading area A (see FIGS. 2 and 3). An end portion 80R of the effective image reading area A is located below the inclined surface 12. Accordingly, by making the surface 12 incline, the end portion 80R can be located sufficiently close to the seam.

Figure 7:
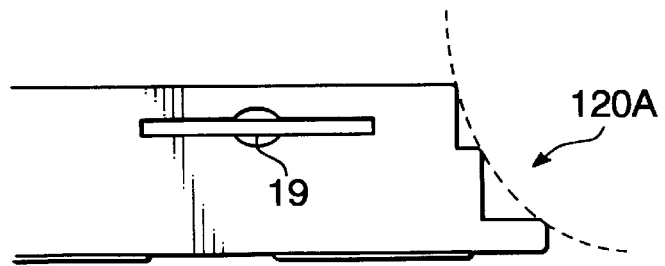
FIG. 7 is a third modification.

In the above-described embodiment, the surface 12 is inclined with respect to the bottom surface 14. However, the invention is not limited to this structure, and can be modified in various ways. That is, as far as the longitudinal end side surface does not interfere with the lifted portion of the book, the surface is not necessarily a planar surface. An example of modifications is shown in FIG. 5. In this example, instead of the planar surface 12, a curved surface 12A is employed. In this case, it is preferable that the surface 12A is a convex surface. Alternatively, the side surface may be formed to have steps as shown in FIG. 6 or 7. The edge of each step, in cross section, could be arranged on a straight line 120 (FIG. 6) or a curved line 120A (FIG. 7).

As described above, according to the present invention, when an image of a page of a thick book is to be scanned, it is ensured that the image reading surface contacts the page to be scanned, and the scanner can be located sufficiently close to the seam.

The present disclosure relates to the subject matter contained in Japanese Patent Application No. HEI 10-132805, filed on May 15, 1998, which is expressly incorporated herein by reference in its entirety.

What is claimed is:

1. A scanner housing, said housing having a planar image reading surface extending in a longitudinal direction of the housing, said image reading surface configured to contact an image to be scanned and for relative movement with respect to the image to be scanned, the housing having a thickness which decreases towards a longitudinal end of the housing, the housing being movable to scan in a direction transverse to a direction in which the housing thickness decreases, wherein, when the scanner is utilized to scan a page of a book by movement parallel to a seam of the book, the decreased thickness portion of the scanner housing enables the scanner to scan a portion of the page close to the seam.

2. The scanner housing according to claim 1, an end of said image reading surface extending within a portion of the housing having the decreased thickness.

3. The scanner housing according to claim 1, said decreased thickness housing portion defining a side surface that is inclined at an acute angle with respect to the image reading surface.

4. The scanner housing according to claim 3, said acute angle lying within a range of 30°–60°.

5. The scanner housing according to claim 4, said inclined surface comprising a planar surface.

6. The scanner housing according to claim 4, said inclined surface comprising a curved surface.

7. The scanner housing according to claim 1, said decreased thickness housing portion being configured as a plurality of steps.

8. The scanner housing according to claim 1, said decreased thickness housing portion defining a convex surface.

9. The scanner housing according to claim 1, said image reading surface comprising a contact type line image sensor.

10. A housing of a scanner, said housing having a planar image reading surface extending in a longitudinal direction of said housing, said image reading surface contacting an original to be scanned, wherein, at least one longitudinal end portion of said housing has a thickness, along a direction perpendicular to said image reading surface, that decreases in accordance with proximity to the end of said housing, said housing configured for movement in a direction transverse to the direction of the decrease in thickness, wherein at least a part of a side surface at the longitudinal end of said housing is an inclined surface that is inclined at an acute angle with respect to sad image reading surface, and wherein said inclined surface includes a planar surface.

11. The housing according to claim 10, wherein an end of said image reading surface extends within said end portion.

12. The housing according to claim 1, wherein said acute angle is within a range of 30 degrees to 60 degrees.

13. The housing according to claim 12, wherein said acute angle is approximately 45 degrees.

14. The housing according to claim 10, wherein said housing containing a contact type line image sensor.

15. The housing according to claim 1, wherein said inclined surface includes a curved surface which is curved at least in the longitudinal direction of said housing.

16. The housing according to claim 15, wherein said curved surface includes a convex surface.

17. The housing according to claim 10, wherein said housing has substantially a rectangular parallelepiped shape.

18. A housing of a scanner, said housing having a planar image reading surface extending in a longitudinal direction of said housing, said image reading surface contacting an original to be scanned, wherein, within at least one longitudinal end portion of said housing, a thickness, along a direction perpendicular to said image reading surface, is smaller at a position closer to the end of said housing, and is larger at a position farther from the end of said housing, and wherein said at least one longitudinal end portion of said housing has steps.

19. The housing according to claim 18, wherein an end of said image reading surface extends within said longitudinal end portion.

20. The housing according to claim 18, wherein said housing contains a contact type line image sensor.

21. The housing according to claim 18, wherein said housing substantially has a rectangular parallelepiped shape.

22. A housing of a scanner, said housing having a planar image reading surface extending in a longitudinal direction of said housing, said image reading surface contacting an original to be scanned, wherein, within at least one longitudinal end portion of said housing, a thickness, along a direction perpendicular to said image reading surface, is smaller at a position closer to the end of said housing, and is larger at a position farther from the end of said housing, wherein said housing has a substantially rectangular parallelepiped shape.

23. The housing according to claim 22, wherein an end of said image reading surface extends within said longitudinal end portion.

24. The housing according to claim 22, wherein at least a part of a side surface at the longitudinal end of said housing is an inclined surface that is inclined at an acute angle with respect to said image reading surface.

25. The housing according to claim 24, wherein said acute angle is within a range of 30 degrees to 60 degrees.

26. The housing according to claim 25, wherein said acute angle is approximately 45 degrees.

27. The housing according to claim 24, wherein said inclined surface includes a planar surface.

28. The housing according to claim 24, wherein said inclined surface includes a curved surface which is curved at least in the longitudinal direction of said housing.

29. The housing according to claim 28, wherein said curved surface includes a convex surface.

30. The housing according to claim 22, wherein said housing contains a contact type line image sensor.

31. The housing according to claim 22, wherein at least a longitudinal end portion of said housing includes steps.

* * * * *